(12) United States Patent
Biris et al.

(10) Patent No.: US 10,859,064 B2
(45) Date of Patent: Dec. 8, 2020

(54) CONTROL SYSTEM FOR MODULAR MULTILEVEL CONVERTER

(71) Applicant: VESTAS WIND SYSTEMS A/S, Aarhus N (DK)

(72) Inventors: Ciprian Biris, Hinnerup (DK); Duy Duc Doan, Tilst (DK); John Godsk Nielsen, Hornslet (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/474,501

(22) PCT Filed: Nov. 29, 2017

(86) PCT No.: PCT/DK2017/050399
§ 371 (c)(1),
(2) Date: Jun. 27, 2019

(87) PCT Pub. No.: WO2018/121821
PCT Pub. Date: Jul. 5, 2018

(65) Prior Publication Data
US 2019/0338753 A1 Nov. 7, 2019

(30) Foreign Application Priority Data
Dec. 27, 2016 (DK) .................................. 2016 00798

(51) Int. Cl.
*F03D 7/04* (2006.01)
*F03D 7/02* (2006.01)
*H02P 11/04* (2006.01)

(52) U.S. Cl.
CPC ........... *F03D 7/042* (2013.01); *F03D 7/0272* (2013.01); *F03D 7/0284* (2013.01); *H02P 11/04* (2013.01)

(58) Field of Classification Search
CPC ...... F03D 7/042; F03D 7/0272; F03D 7/0284; H02P 11/04
(Continued)

(56) References Cited

U.S. PATENT DOCUMENTS 6,566,764 B2 * 5/2003 Rebsdorf ................ H02P 9/007
290/44
6,856,038 B2 * 2/2005 Rebsdorf ................ H02P 9/007
290/44
(Continued)

FOREIGN PATENT DOCUMENTS

CN 102790515 A 11/2012
CN 104795835 A 7/2015
(Continued)

OTHER PUBLICATIONS

PCT International Search Report for Application No. PCT/DK2017/050399 dated Feb. 13, 2018.
(Continued)

*Primary Examiner* — Pedro J Cuevas
(74) *Attorney, Agent, or Firm* — Patterson + Sheridan, LLP

(57) ABSTRACT

A power conversion system for a wind turbine generator, comprising a machine-side converter having an AC voltage input from a generator and a DC voltage output to a DC link, wherein the machine-side converter is a modular multi-level converter comprising one or more converter legs corresponding to a respective one or more electrical phases of the generator, each of the converter legs comprising a plurality of converter cells, the system further comprising: a converter control module which provides the machine-side converter with a gate signal, and an electrical frequency estimation module configured to estimate the mean electrical frequency of the generator; wherein the gate signal has at least one mean switching frequency corresponding to at least one
(Continued)

electrical phase of the generator; wherein the converter control module is configured to modulate the mean switching frequency of the gate signal in dependence on the mean electrical frequency of the generator.

17 Claims, 8 Drawing Sheets

(58) Field of Classification Search
USPC .................................................. 290/44, 55
See application file for complete search history.

(56) References Cited

U.S. PATENT DOCUMENTS

| | | | | |
|---|---|---|---|---|
| 6,972,972 | B2* | 12/2005 | Duncan | H02M 7/003 363/131 |
| 7,423,412 | B2* | 9/2008 | Weng | H02J 3/386 322/20 |
| 7,511,385 | B2* | 3/2009 | Jones | H02M 5/4585 290/43 |
| 7,919,879 | B2* | 4/2011 | Flannery | H02P 9/007 290/44 |
| 8,248,039 | B2* | 8/2012 | Cao | F03D 7/043 322/37 |
| 8,253,393 | B2* | 8/2012 | Bo | F03D 7/0272 322/44 |
| 8,853,876 | B1* | 10/2014 | Wagoner | H02J 3/386 290/44 |
| 9,018,783 | B2* | 4/2015 | Cooper | F03D 9/25 290/44 |
| 9,093,924 | B2* | 7/2015 | Gupta | H02M 7/53875 |
| 9,190,923 | B2* | 11/2015 | Yuan | H02P 9/02 |
| 9,353,732 | B2* | 5/2016 | Gupta | H02J 3/381 |
| 9,461,572 | B2* | 10/2016 | Wessels | H02J 3/1885 |
| 9,537,437 | B2* | 1/2017 | Wagoner | H02P 9/007 |
| 9,548,690 | B2* | 1/2017 | Ren | F03D 7/0284 |
| 9,641,113 | B2* | 5/2017 | Larsen | F03D 7/048 |
| 9,863,400 | B2* | 1/2018 | Hardwicke, Jr. | F03D 80/70 |
| 9,899,999 | B2* | 2/2018 | Rannestad | H03K 17/0822 |
| 10,018,180 | B2* | 7/2018 | Kjær | F03D 7/048 |
| 10,103,665 | B2* | 10/2018 | Wagoner | H02K 11/33 |
| 10,199,970 | B2* | 2/2019 | Andersen | H02P 9/04 |
| 10,205,399 | B2* | 2/2019 | Dong | H02J 3/386 |
| 10,544,778 | B2* | 1/2020 | Zhou | H02K 7/183 |
| 10,622,923 | B2* | 4/2020 | Andersen | H02P 9/006 |
| 2002/0079706 | A1* | 6/2002 | Rebsdorf | H02M 5/297 290/55 |
| 2004/0024937 | A1* | 2/2004 | Duncan | H02M 7/003 710/100 |
| 2004/0026929 | A1* | 2/2004 | Rebsdorf | H02M 5/297 290/44 |
| 2007/0177314 | A1* | 8/2007 | Weng | H02P 9/007 361/20 |
| 2007/0278797 | A1* | 12/2007 | Flannery | F03D 7/0284 290/44 |
| 2010/0327585 | A1* | 12/2010 | Cao | F03D 7/0272 290/44 |
| 2011/0140430 | A1* | 6/2011 | Ritter | H02P 9/102 290/44 |
| 2011/0175354 | A1* | 7/2011 | Bo | F03D 7/044 290/44 |
| 2013/0134710 | A1* | 5/2013 | Yuan | H02M 5/458 290/44 |
| 2013/0265809 | A1* | 10/2013 | Gupta | H02J 3/386 363/131 |
| 2014/0008912 | A1* | 1/2014 | Gupta | F03D 9/255 290/44 |
| 2014/0319838 | A1* | 10/2014 | Wagoner | F03D 7/0272 290/44 |
| 2014/0346774 | A1* | 11/2014 | Cooper | H02J 3/386 290/44 |
| 2015/0084337 | A1* | 3/2015 | Wagoner | H02M 1/38 290/44 |
| 2015/0159625 | A1* | 6/2015 | Hardwicke, Jr. | F03D 7/0272 290/44 |
| 2015/0249412 | A1* | 9/2015 | Larsen | H02J 3/44 290/44 |
| 2015/0249413 | A1* | 9/2015 | Ren | H02P 9/102 290/44 |
| 2015/0249416 | A1* | 9/2015 | Barker | H02H 7/067 290/44 |
| 2015/0349688 | A1* | 12/2015 | Wagoner | F03D 9/255 290/44 |
| 2016/0036430 | A1* | 2/2016 | Rannestad | H02M 7/44 363/132 |
| 2017/0234299 | A1* | 8/2017 | Kjær | F03D 7/048 290/44 |
| 2018/0091077 | A1* | 3/2018 | Andersen | H02P 9/04 |
| 2018/0119674 | A1* | 5/2018 | Kj R | F03D 9/25 |
| 2018/0159453 | A1* | 6/2018 | Andersen | H02P 9/007 |
| 2018/0198393 | A1* | 7/2018 | Wagoner | H02P 9/00 |
| 2018/0205335 | A1* | 7/2018 | Dong | H02M 7/797 |
| 2018/0291876 | A1* | 10/2018 | Zhou | F03D 9/257 |
| 2019/0148949 | A1* | 5/2019 | Biris | H02J 3/381 290/44 |
| 2019/0195189 | A1* | 6/2019 | Echenique Subiabre | F03B 15/00 |

FOREIGN PATENT DOCUMENTS

| | | |
|---|---|---|
| EP | 2605390 A1 | 6/2013 |
| WO | 2015108614 A1 | 7/2015 |
| WO | 2018121821 A1 | 7/2018 |

OTHER PUBLICATIONS

Xiang et al. "Switching Frequency Dynamic Control for DFIG Wind Turbine Performance Improvement Around Synchronous Speed", IEEE Transactions on Power Electronics, vol. 32, No. 9, Sep. 2017, 7271-7283.
PCT Written Opinion of the International Searching Authority for Application No. PCT/DK2017/050399 dated Feb. 13, 2018.
Nami et al. "Modular Multilevel Converters for HVDC Applications: Review on Converter Cells and Functionalities", IEEE Transactions on Power Electronics, vol. 30, No. 1, Jan. 2015, 19 pages.
Wang et al. On Inertial Dynamics of Virtual-Synchronous-Controlled DFIG-Based Wind Turbines, IEEE Transactions on Energy Conversion, vol. 30, No. 4, Dec. 2015, 12 pages.
Danish Patent and Trademark Office 1st Technical Examination of Patent Application PA 2016 00798 dated Jun. 13, 2017.
European Examination Report for Application No. 17 808 765.6-1201 dated Jun. 4, 2020.

* cited by examiner

CONTROL SYSTEM FOR MODULAR MULTILEVEL CONVERTER

TECHNICAL FIELD

The present invention relates to a control system for a wind turbine generator, to a method of controlling a wind turbine generator and to a wind turbine generator.

BACKGROUND

Modular multi-level converters (MMCs) provide scalable and particularly resilient alternatives to two-stage or three-stage power converters. MMCs are particularly useful for stable applications having fixed parameters and are therefore often used within power networks. The advantages lie in low harmonic distortion, availability of components, the fail-safe operation of the components, and the potential to achieve different voltage levels and to operate at different voltage steps.

The properties of scalability, redundancy and high voltage variation are desirable in power supply converters, and especially in converters for wind turbine generators. The voltages generated by wind turbine generation are increasing with improvements to manufacturing techniques, which has in turn led to an increase in the popularity of wind turbine generators. It is therefore now particularly important that the efficiency of wind turbine generators is as high as possible. It is for this reason that MMCs have been recently incorporated into wind turbines as machine-side power converters.

However, the conditions in which an MMC must operate in a wind turbine generator are in stark contrast to those of a power network having generally stable and fixed parameters. Wind turbine generators are susceptible to constant changes and variation in conditions, which may subsequently lead to large losses and inefficiencies in MMCs that are not adapted to power generation in wind turbines.

It is an aim of the present invention to mitigate or overcome at least some of the above-mentioned problems.

SUMMARY OF THE INVENTION

According to an aspect of the present invention there is provided a power conversion system for a wind turbine generator, comprising a machine-side converter having an AC voltage input from a generator and a DC voltage output to a DC link, wherein the machine-side converter is a modular multi-level converter comprising one or more converter legs corresponding to a respective one or more electrical phases of the generator, each of the converter legs comprising a plurality of converter cells, the system further comprising: a converter control module which provides the machine-side converter with a gate signal, and an electrical frequency estimation module configured to estimate the mean electrical frequency of the generator; wherein the gate signal has at least one mean switching frequency corresponding to at least one electrical phase of the generator; wherein the converter control module is configured to modulate the mean switching frequency of the gate signal in dependence on the mean electrical frequency of the generator.

Advantageously, in linking the mean switching frequency and the mean electrical frequency of the generator, the power conversion system reduces the likelihood of switching losses and beneficially adapts a modular multi-level converter that can operate at a higher range of generator speeds or electrical frequencies. This ensures that the efficiency of the power conversion system and of the wind turbine is increased. By altering the switching frequency of the converter, components within the converter are also utilised more efficiently.

The converter control module may determine the mean switching frequency as proportional to the mean electrical frequency of the generator. For example, the mean switching frequency may be linearly or non-linearly proportional to the mean electrical frequency.

The gate signal may be generated by comparison of a carrier signal with a reference signal, wherein the carrier signal has a mean carrier frequency. The converter control module may be configured to modulate the mean switching frequency of the gate signal by modulating the mean carrier frequency of the carrier signal. This is advantageous when the system is controlling the converter according to a carrier-based pulse-width modulation process. Alternatively, the converter may be controlled using space-vector pulse-width modulation, and the converter control module may be configured to modulate the mean switching frequency of the gate signal by modulating switching vectors.

The converter control module may be configured to determine if the mean electrical frequency of the generator exceeds a predetermined threshold, and, in response, to set the mean switching frequency to a predetermined limit level so as to maintain the stability of the system and to protect the components.

The predetermined threshold may be a variable threshold calculated according to measured operational parameters of the wind turbine generator.

The predetermined may be a threshold is a minimum speed threshold. Alternatively, the predetermined may be a maximum speed threshold.

The electrical frequency estimation module may comprise a phase-locked loop or a speed sensor.

The power conversion system may comprise a line-side converter having a DC voltage input from the machine-side converter and an AC voltage output to a transformer. The line-side converter may be a modular multi-level converter comprising one or more converter legs corresponding to a respective one or more electrical phases of the generator, each of the converter legs comprising a plurality of converter cells. The power conversion system may be configured to provide the line-side converter with a gate signal.

According to another aspect of the present invention there is provided a wind turbine generator comprising the power conversion system as previously described.

According to another aspect of the present invention there is provided a method of controlling a power conversion system for a wind turbine generator, the power conversion system comprising a machine-side converter having an AC voltage input from a generator and a DC voltage output to a DC link, wherein the machine-side converter is a modular multi-level converter comprising one or more converter legs corresponding to a respective one or more electrical phases of the generator, each of the converter legs comprising a plurality of converter cells, the method comprising the steps of: estimating a mean electrical frequency of the generator; generating a gate signal having at least one mean switching frequency and corresponding to at least one phase of the generator; modulating the mean switching frequency of the gate signal in dependence on the mean electrical frequency of the generator; and communicating the gate signal to the modular multi-level converter.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 5 is a chart outlining the generation of a gate signal for use in the cell of FIG. 4a;

DETAILED DESCRIPTION

Figure 1:
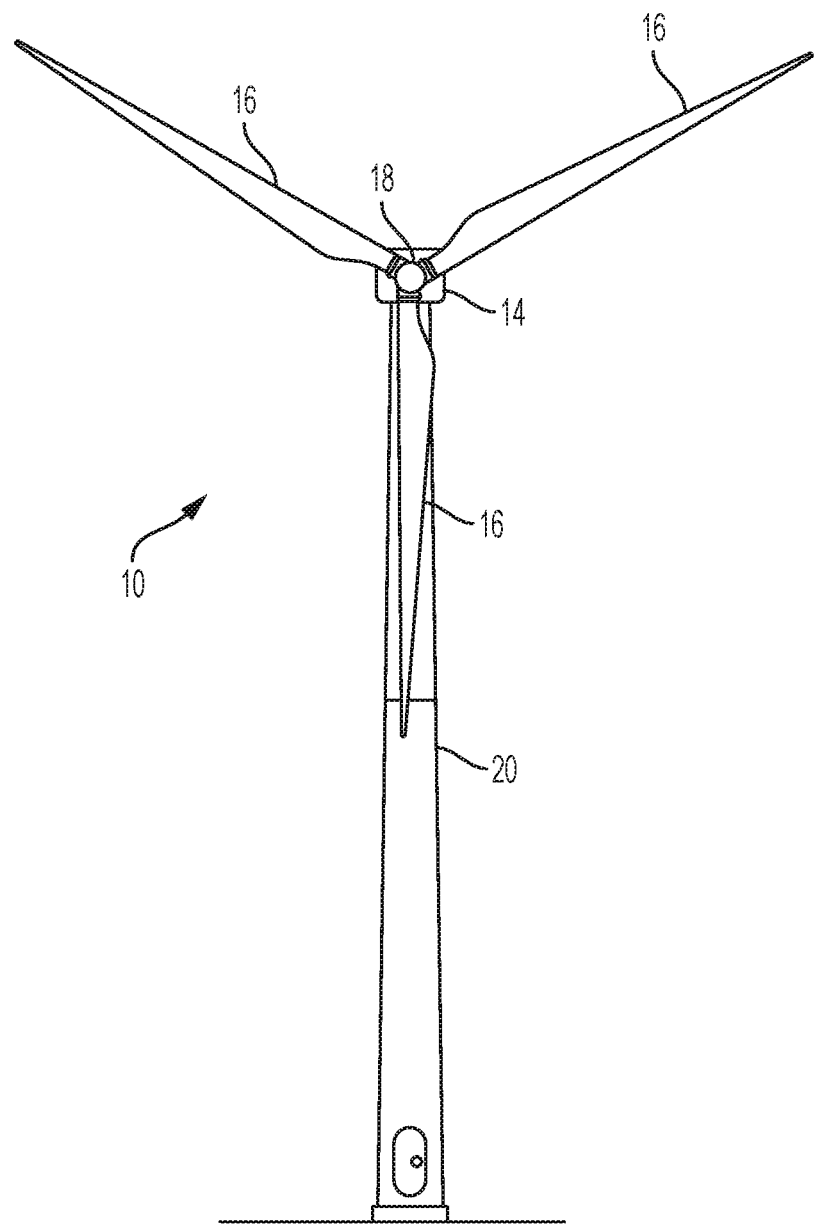
FIG. 1 is a front view of a wind turbine within which the embodiments of the invention may be incorporated.

In order to place the embodiments of the invention in a suitable context, reference will firstly be made to FIG. 1. In FIG. 1, a wind turbine, or wind turbine generator, 10 comprises a rotor 12 including a hub 14 to which is attached three wind turbine blades 16. The rotor 12 is rotatably supported by a nacelle 18 that is mounted to the top of a tower 20 in the usual way. The nacelle 18 houses and supports various power generating components of the wind turbine 10, as will be described. As is known, the flow of wind acting on the blades 16 spins the rotor 10 which drives the power generation equipment housed in the nacelle 18. The power generation equipment is shown in more detail in FIG. 2.

The wind turbine 10 illustrated in FIG. 1 is an onshore wind turbine, although the invention may equally be applied to an offshore wind turbine. Here, the wind turbine is a horizontal axis type (HAWT) having three blades 16, which is a common type of system, although other types having different numbers of blades exist to which the invention is also applicable.

Figure 2:
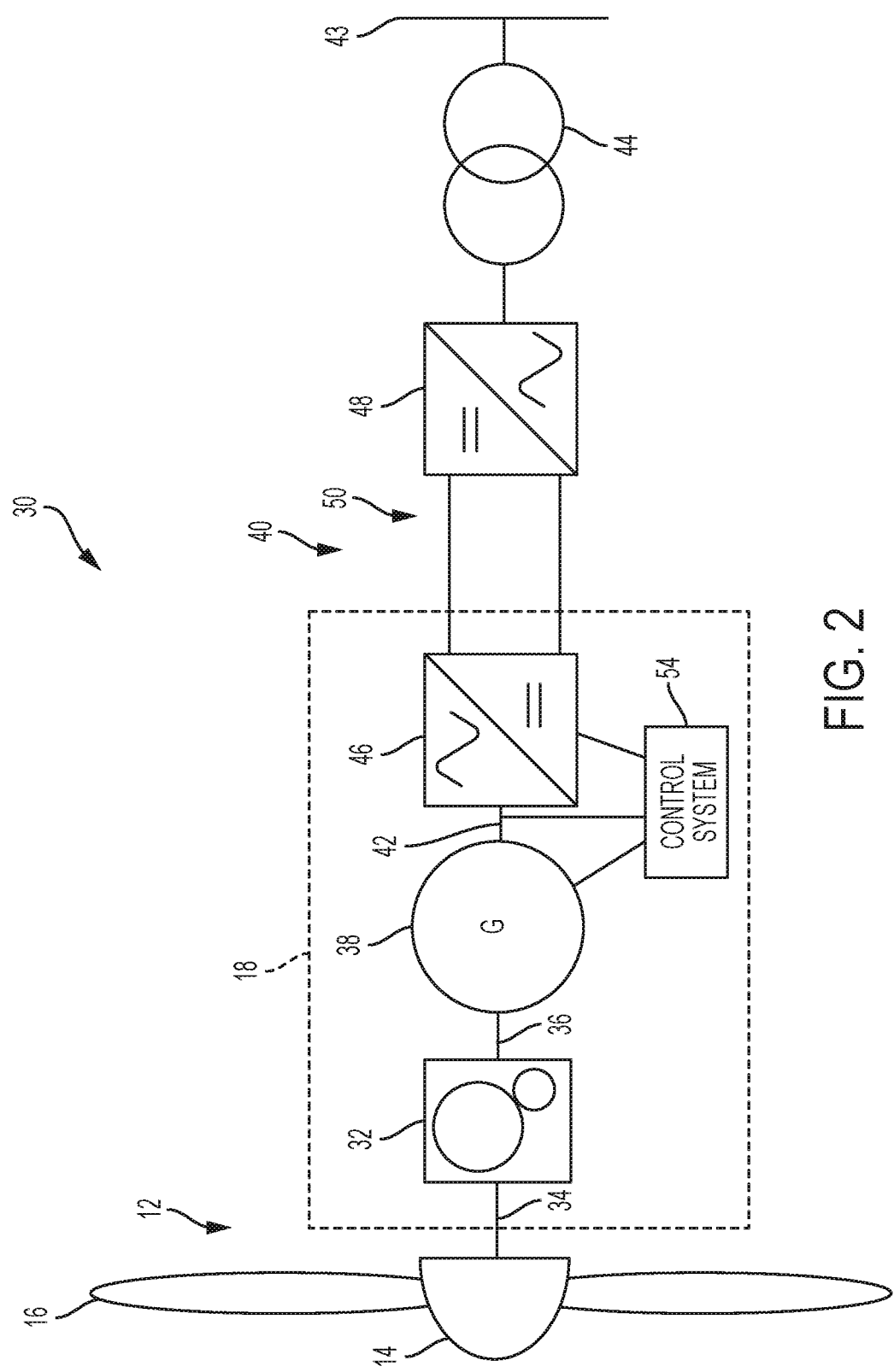
FIG. 2 is a systems view of the wind turbine in FIG. 1, which illustrates an example of a suitable power generation and control architecture suitable for the embodiments of the invention.

FIG. 2 illustrates an example of a power generation system architecture 30 that may be incorporated into the wind turbine 10. In the system architecture 30 of FIG. 2, the rotor 12 drives a transmission 32 by way of an input drive shaft 34. Although the transmission 32 is shown here in the form of a gearbox, it is also known for wind turbines to have direct-drive architectures which do not include a gearbox. The transmission 32 has an output shaft 36 which drives an electrical generator 38 for generating three-phase electrical power.

The generator 38 is connected to a power converter 40 by a suitable three-phase electrical connector 42 such as a cable or bus. The power converter 40 converts the output frequency of the generator 38 to a voltage level and frequency that is suitable for supplying to an electrical grid 43 via a transformer 44. The architecture 30 includes a generator- or machine-side converter 46, and a line- or grid-side converter 48 which are coupled via a DC link 50. The wind turbine 10 also comprises a control system 54, which controls the operation of the generator-side converter 46 and connects to both the generator-side converter 48 and the connector 42 that connects the generator-side converter 46 and the generator 38. The control system 54, which acts to control the operation of the generator-side converter 46 to ensure an efficient conversion of power, is housed within the nacelle 18 of the wind turbine 10 along with the transmission 32, generator 38 and generator-side converter 46. The control system 54 is operable to directly or indirectly measure the speed of the wind turbine 10 and to alter the frequency with which components of the generator-side converter 46 are operated in order to match the measured speed.

Considering the generator-side converter 46 in more detail, power input to the generator-side converter 46 by the generator 38 is converted from its three-phase alternating current (AC) signal into a direct current (DC) signal. This is necessary as the power produced in the electrical generator 38 is not in a form suitable for delivery to the grid 43. This is typically because the power is not at the correct frequency or phase angle as these values are determined, at least in part, by the speed of rotation of the rotor 12, which in turn is dependent on wind conditions. The conversion is performed to supply a DC voltage to the grid-side converter 48 for re-conversion to an AC voltage having a form suitable for supply to the grid 43. In general terms, therefore, the system architecture 30 provides AC to AC conversion, which it achieves by feeding electrical current through an AC-DC converter followed by a DC-AC converter in series.

The generator-side converter 46 has a modular, multilevel architecture, and is therefore classified as a modular, multilevel converter (MMC). In general, the functionality of a modular multi-level converter and its principles of operation are known in the art, but a brief discussion is provided here to provide a functional overview and suitable context to the invention.

Figure 3:
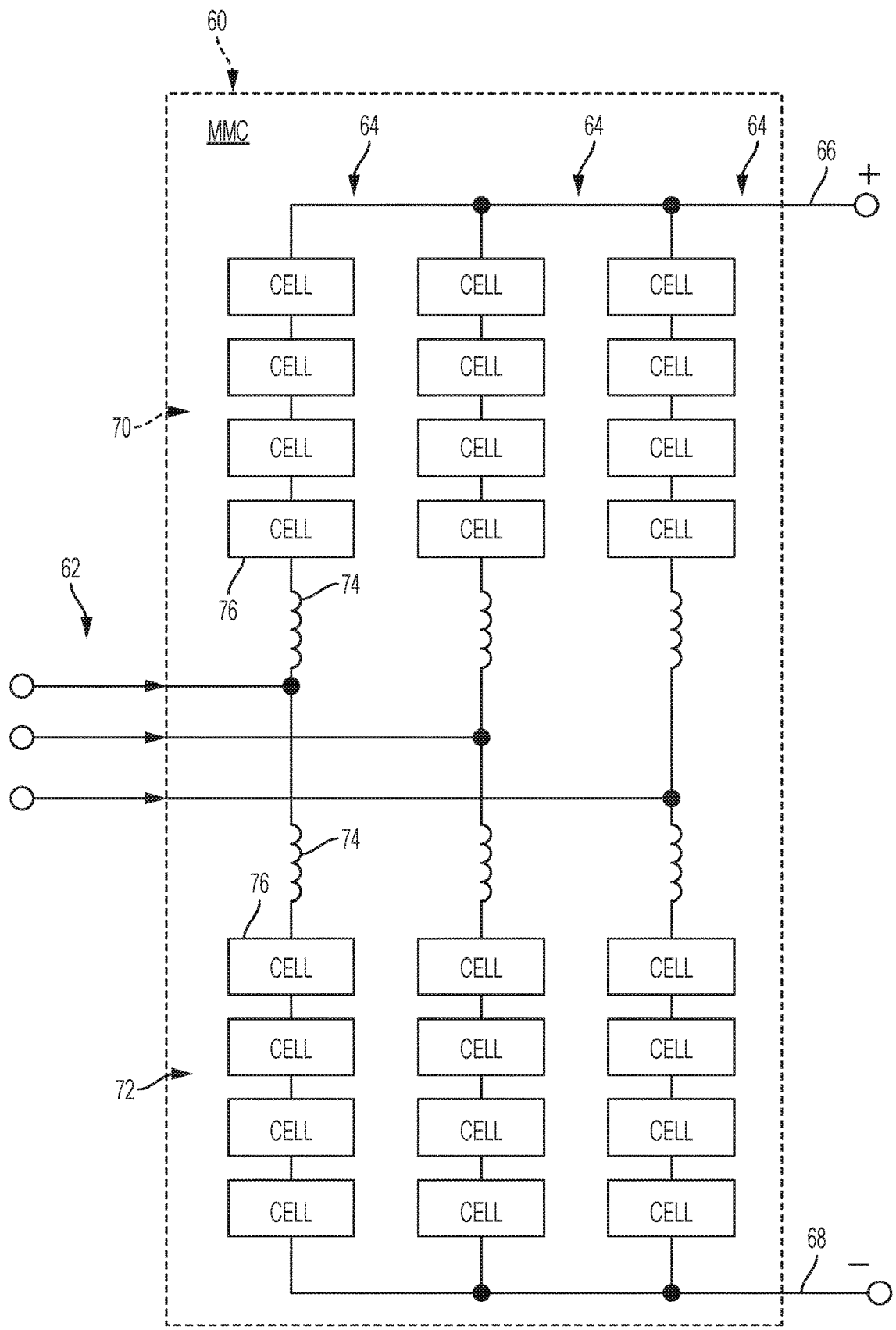
FIG. 3 is a schematic representation of a typical modular, multilevel converter of the kind that may be used in the architecture of FIG. 2.

To aid with the explanation of the invention, a typical MMC architecture 60 is shown in FIG. 3. The MMC 60 includes three inputs 62, one input for each phase of the generator 38, with each input being connected to a corresponding leg 64 of the generator-side converter 46. The legs 64 are arranged in parallel with one another and connect at either end to the two outputs 66, 68 of the MMC 60 which connect to the DC link 50. Each leg 64 of the MMC 60 is split into two substantially similar arms 70, 72, each arm 70, 72 having a respective inductor 74, for reducing losses due to circulating currents, and four substantially identical cells 76. The inductors 74 and the cells 76 are arranged in series. MMC architecture and pulse-width modulation in MMCs are discussed by Li et al [1], Rejas et a. [2], Madichetty et al. [3], Islam et al. [4] and Morozovska [5].

Figure 4A:
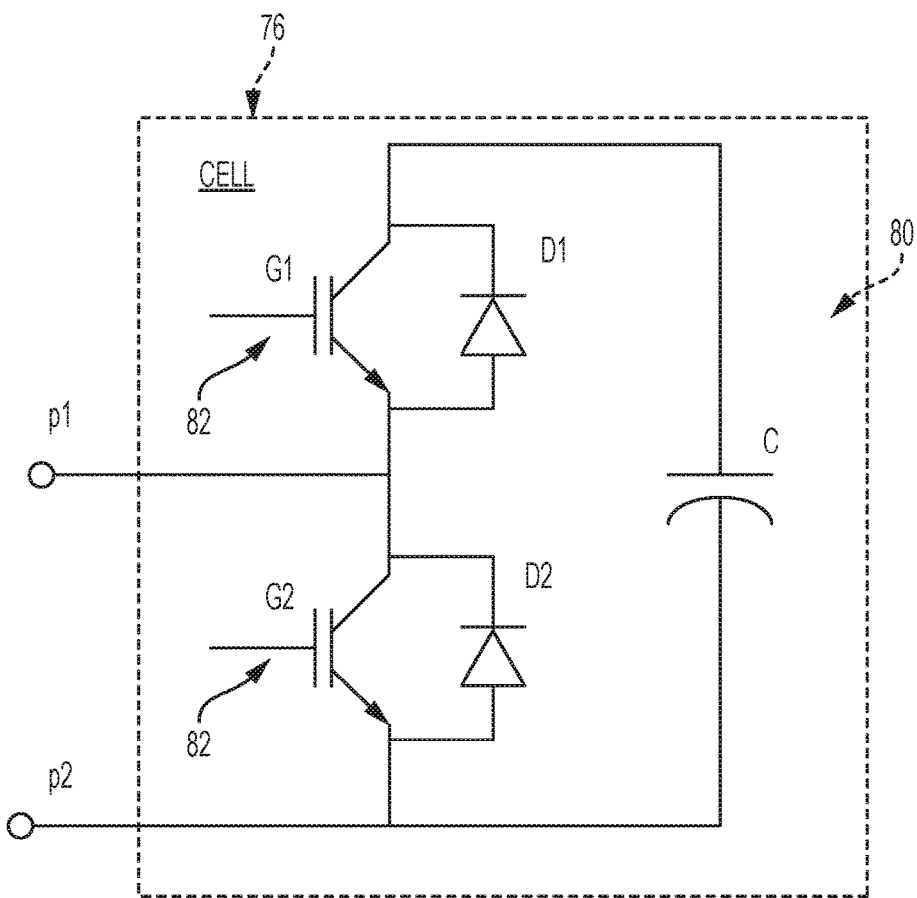
FIGS. 4a to 4c are schematic representations of a cell that may be incorporated into the modular, multilevel converter of FIG. 3.

Each cell 76 of the MMC 60 comprises a half-bridge sub-circuit 80, an example of which is shown in FIG. 4a. The cell 76 of FIG. 4a comprises two semiconductor switching devices in the form of Integrated Gate Bipolar Transistors (IGBTs), here labelled 'G1' and 'G2'. Each IGBT is arranged in parallel with a respective diode 'D1' and 'D2', and the two IGBT-diode combinations are arranged in series with each other and a polarized capacitor 'C'. The cell 76 connects to the rest of the MMC 60 at nodes 'p1' and 'p2'.

It will be appreciated that an MMC may contain any number of cells on each arm, and that the example architecture 60 having four cells 76 as shown in FIG. 3 is purely for illustrative purposes only. For example, some MMCs may have upwards of 10 cells per arm. The inclusion of a greater number of cells on each arm is necessary in some circumstances to allow the MMC to scale up so as to handle higher power levels.

It will also be appreciated that the circuitry of an MMC cell is not limited to half-bridge circuits, but may comprise full bridge circuits or any other suitable cell configurations that would be understood to the person skilled in power conversion technology for wind turbines. Furthermore, each cell may comprise a different circuit, such that in some embodiments, the MMC may comprise a mixture of half bridge and full bridge circuitry.

In operation, each cell 76 can be operated to supply either 0 V in a 'bypassed' state or a capacitor voltage $V_c$ in an 'active' state. The operation of each cell 76 is dependent upon switching of each IGBT G1, G2 using a respective gate signal supplied via a gate input 82.

Figure 4B:
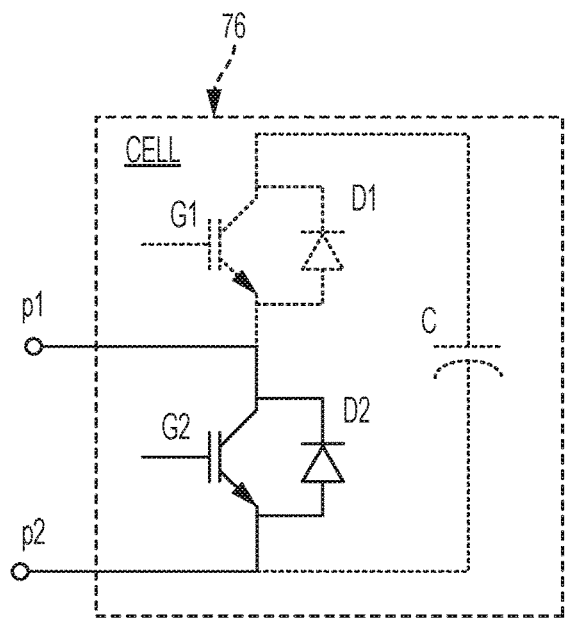

The bypassed state of the cell 76 is shown in FIG. 4b in which the IGBT G2 is switched 'on' and IGBT G1 is switched 'off', i.e. G2 is allowing current flow, while G1 is not. This means that when current is flowing in the direction from node p1 to p2 (i.e. in the positive direction), no current can flow through the diode D2, but instead flows through the switching device G2. Similarly, when current flow is from p2 to p1 (i.e. in the negative direction), the flow is through the diode D2. In the bypassed state, the capacitor voltage will be equal to zero and will be isolated from the system, resulting in 0 V in the bypassed state.

Figure 4C:
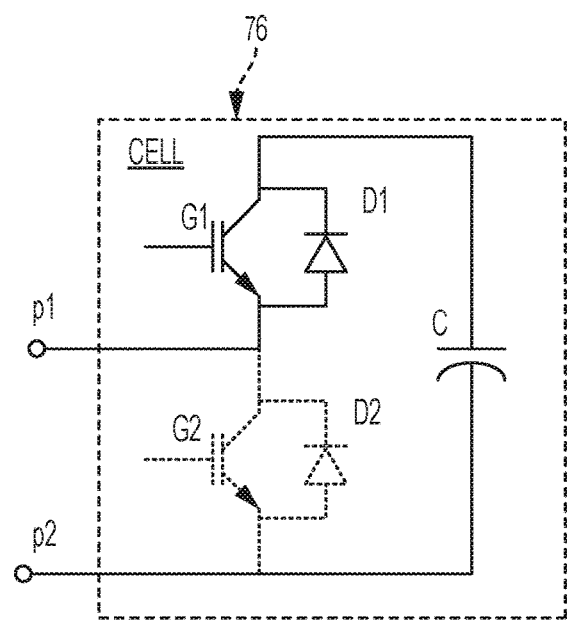

In the active state, as shown in FIG. 4c, IGBT G1 is switched 'on' and IGBT G2 is switched 'off'. This means that G1 allows the flow of current through it, while G2 does not. In this active state, current flowing from node p1 to p2 through the diode D1 of the cell 76 results in charging of the polarized capacitor C, thereby increasing the voltage. When the current flow is in the opposite direction, and therefore through the switching gate G1, the capacitor C discharges through the gate G1.

The cell 76 therefore imitates a switchable voltage supply, and the voltage supply of each cell 76 in an arm 70, 72 can effectively be 'stacked' to supply a predetermined voltage level. So, when all four cells 76 of one arm 70, 72 of the MMC 60 of FIG. 3 are operating in the active state at the same time, the voltage output of that arm 70, 72 is equal to 4 times the voltage of an individual cell 76. Through appropriate control of all cells 76, a desired DC output can be delivered to the DC link 50.

The cells 76 are controlled by respective gate signals generated by the control system 54. For example, the gate signals may comprise a carrier-based pulse-width modulation (PWM) drive signal or a space vector PWM drive signal. The gate signal for each cell 76 comprises a plurality of pulses which switch the cell 76 to the active state. The signal has a mean switching frequency that can be thought of as the frequency of the pulse. The signal also has a duty cycle that defines the length of each pulse. Hence, together, the mean switching frequency and mean duty cycle define the ratio between the time for which the cell 76 is in the active state and the time for which the cell 76 is in the bypassed state. The gate signals for each cell 76 is altered to implement cumulative voltage output and to generate an output from the MMC 60 that is useful for the purposes of the DC link 50 and the grid-side converter 48.

To determine the parameters of the gate signal, a comparison between a reference signal, generally in the form of a sine wave signal, and a carrier signal, generally in the form of a sawtooth, inverse sawtooth or triangle wave signal, is performed. Other signal types for use as a reference signal or carrier signal would be known to the skilled person.

Figure 5:
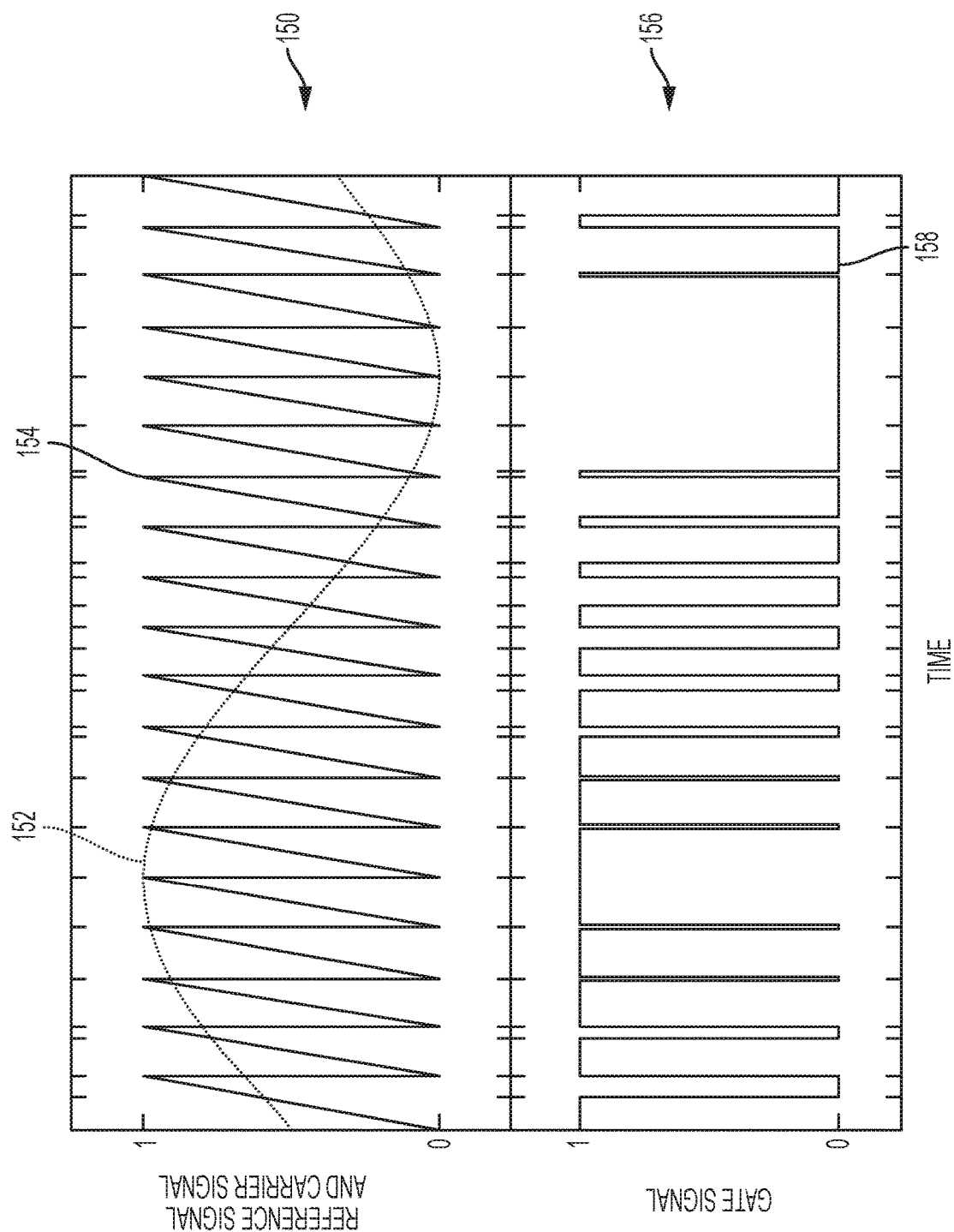
Figure 6A:
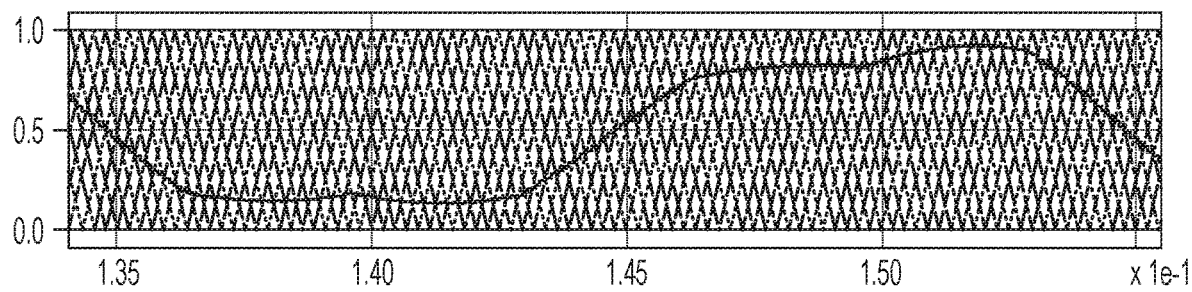
FIG. 6 is a series of charts illustrating the use of a plurality of gate signals to control the output of a modular, multilevel converter.
Figure 6B:
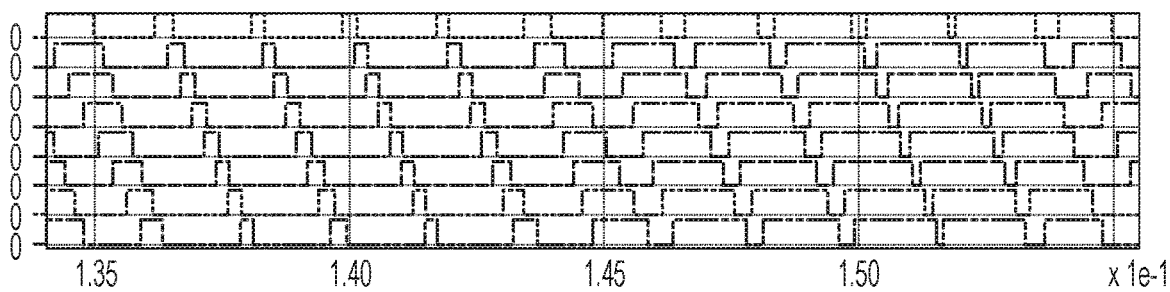
Figure 6C:
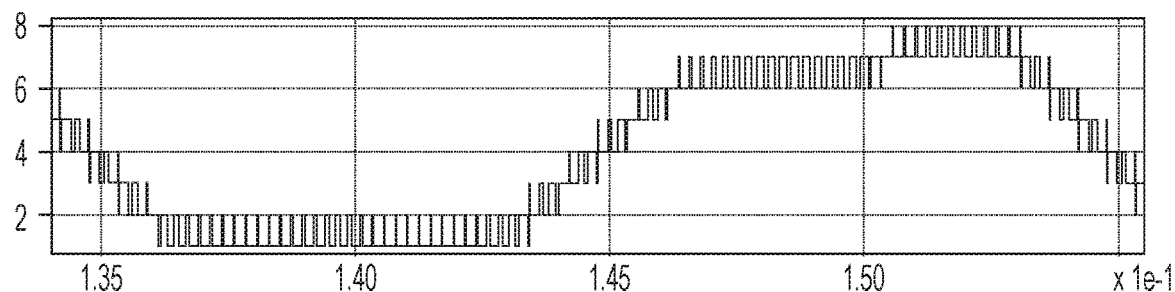
Figure 6D:
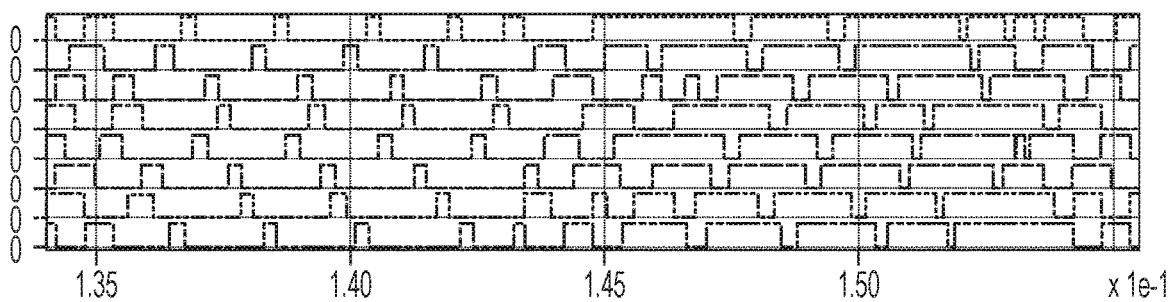

FIG. 5 illustrates, on a first chart 150, a single cycle of the reference signal 152 in the form of a sine wave signal together with the carrier signal 154 in the form of a sawtooth wave. On a second chart 156, FIG. 5 illustrates the corresponding output gate signal 158 obtained using the carrier signal 154 and reference signal 152 of the first chart 150.

The reference signal 152 used in an AC-DC converter of this type is based upon the AC phase signal received from the generator 38. As each leg 64 of the MMC 60 is directed towards one phase of three, three reference signals 152 are utilised to generate gate signals 158 with each reference signal 152 having a different phase. The reference signal 152 has been normalised relative to the carrier signal 154 so that the maximum and minimum values of the reference and carrier signals 152, 154 are equal.

The determination of the gate signal 158 is performed by comparison of the carrier and reference signals 154, 152. In order to do this, the level of the carrier signal 154 and the level of the reference signal 152 are continually compared. If the level of the reference signal 152 is greater than that of the carrier signal 154, the gate signal 158 is set to equal 1. If the level of the reference signal 152 is less than that of the carrier signal 154, the gate signal 158 is set to equal 0. As would be expected, gate signal levels of 1 correspond to switching the cell 76 receiving the gate signal 158 to the active state, while gate signal levels of 0 correspond to the bypassed state of the cell 76.

Having generated a gate signal 158 based upon the carrier and reference signals 154, 152 as detailed above, the control system 54 operates each cell 76 to best recreate the respective reference signal 152 for the leg 64. The control system 54 utilises an appropriate algorithm to select the most appropriate cells 76 to be switched and the order to switch the cells 76.

For example, a "Sort and Select" algorithm may be used. Operating according to a sort and select algorithm, the control system 54 sorts the cells 76 based on their capacitor C voltages and then select the cells 76 based upon that sorting. Using this algorithm, the control system 54 switches the cells 76 so that when current flow within the system is in the positive direction, cells 76 whose polarized capacitors C have the lowest voltages are switched to the active state so that their capacitors C are charged. Meanwhile, when current flows in the negative direction, cells 76 whose capacitors C have the highest voltages are activated to allow discharge of their capacitors C.

An example of the process required to operate an MMC having eight cells per arm is shown in FIG. 6. The process extends from the comparison of reference and carrier signals stage to the cell balancing stage. FIG. 6 includes four separated charts, each illustrating a different stage of the process.

The uppermost chart, labelled in FIG. 6 as 'a', illustrates the comparison of triangular-wave signals, one signal for each cell of the arm, against a reference signal. As can be seen, each of the carrier signals is phase shifted relative to the other carrier signals.

The result of the carrier signal and reference signal analysis in a is shown in the chart labelled 'b', in which eight gate signals are generated, each corresponding to a particular carrier signal.

When implemented at the respective gates of the arm, the output of the arm, known as the modulated arm reference, is the sum of the waveforms shown in chart b. The modulated arm reference illustrated in the chart labelled 'c'.

To ensure that a voltage balance is maintained across all cells, a sort and select algorithm, or other appropriate cell balancing algorithm, is implemented as described above, and the results of this algorithm performed on the gate signals of chart b is shown in the bottom chart, 'd'. So, it can be seen that the number of cells that are in the active state in chart b corresponds to the number of cells that are in the active state in chart d. However, the order of switching of the cells changes based upon the requirements of the cell capacitor.

When considering known systems, it will be appreciated that while the reference signal may vary due to changes in generator speed, a constant carrier signal is used.

However, if a particularly high reference signal is generated, the gate signal generated using the constant carrier signal may not correctly recreate the reference signal once implemented, and may in fact recreate a signal having a different frequency to that of the reference signal.

Therefore, the control system 54 in accordance with the invention is configured to vary the mean frequency of the carrier signal 154 to be proportional to the mean frequency of rotation of the wind turbine blades 16. Therefore, the mean switching frequency of the gate signal 158, i.e. the mean frequency with which each cell 76 is switched between active and bypassed states, is altered to be proportional to the frequency of rotation of the blades 16, and the speed of the generator 38. Note that 'speed' may refer to the mechanical rotational speed of the generator 38 or the electrical frequency of the waveform generated by the generator 38, or in other words the generator electrical frequency. It will be appreciated that these speed parameters are necessarily linked to one another, such that the generator electrical frequency can be calculated given the rotational speed of the generator 38, and the number of pole pairs in the generator 38, for example. Here, references to 'speed' shall be interpreted in this context.

Returning to FIG. 2, the control system 54 is provided to implement feed-forward and feed-back control loop for the generator-side converter 46.

Figure 7:
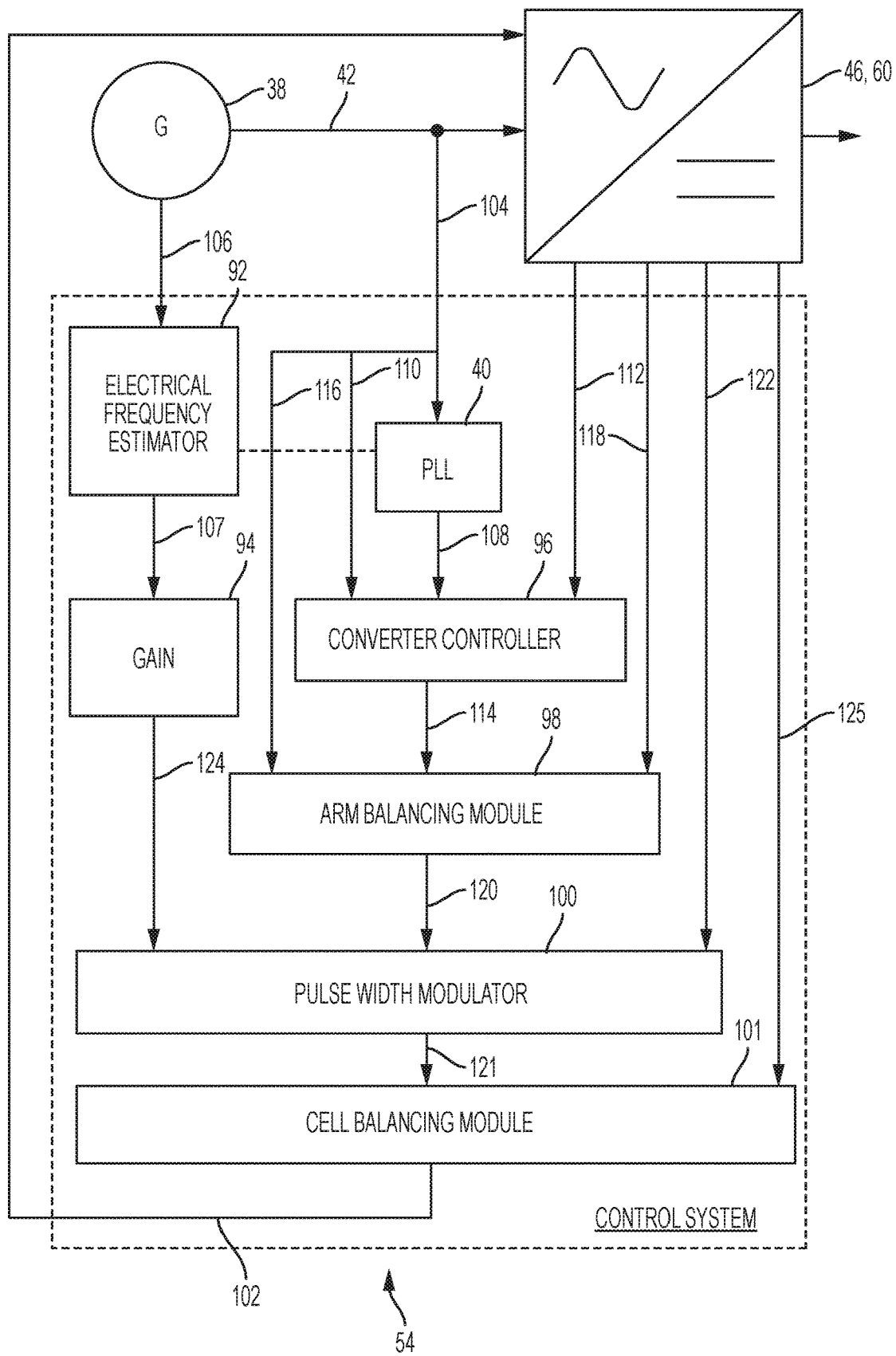
FIG. 7 is a schematic representation of a control system for use in the converter of FIG. 2.

FIG. 7 shows the control system 54 in more detail. FIG. 7 relates to one phase output from the generator 38 and to a single cell 76 within one leg 64 of the MMC 60 only for clarity. In practice, however, the control system 54 shown in FIG. 7 may simultaneously operate to calculate all gate signals for every cell 76. Alternatively, a separate control system 54 may be specifically assigned to each phase and therefore each leg 64 of the MMC 60 or to each individual cell 76 of the MMC 60, each separate control system 54 being arranged as in FIG. 7.

The control system 54 probes the wind turbine generator 10 at its generator 38, at the connector 42 between the generator 38 and the generator-side converter 46, and at the generator-side converter 46 to sample electrical signals that are indicative of current or voltage of different components, for example. In particular, the system gathers raw data relating to the current and voltage of the outputs from the electrical generator 38.

The control system 54, which comprises a Phase Lock Loop (PLL) 90, an electrical frequency estimator 92, a gain module 94, a converter controller 96, an arm balancing module 98, a pulse-width modulator 100, and a cell balancing module 101, gathers the data and outputs a gate signal 102. In some embodiments, the estimator 92 and the PLL 90 may be combined. In some embodiments, the cell balancing module 101 and pulse-width modulator 100 may be combined.

In addition to current and voltage levels 104 gathered by the control system 54 at the connector 42, the electrical frequency 106 of the generator 38 is measured to facilitate estimation of the generator speed, thereby allowing implementation of a variable switching frequency in the manner described above. Furthermore, voltage and current measurements from the converter 46 are fed back to the control system 54 to further refine the operation of the system 54.

Initially, the measured voltage 104 from the connector 42 is input to the PLL 90. The PLL 90 generates output signals 108 whose phase is locked in relation to or is related to the phase of the input signals. The phases can therefore be isolated and the output 102 of the control system 54 can be matched to the voltage and current measurements received at each leg 64 of the MMC 60 in the generator-side converter 46, thereby reducing losses and maximising the efficiency of the system 30.

The PLL 90 generates a first signal, e, corresponding to the phase position of the generator 38, and thereby forming a sawtooth wave having a frequency proportional to that of the frequency of rotation of the turbine blades 16. From this first signal, a second signal, $\Omega$, is determined and generated, which corresponds to the electrical frequency of the generator 38.

Both the first and second signals 108 generated by the PLL 90 are communicated to the converter controller 96. Other inputs to the converter controller 96 include the measured connector voltage and current 110 and the measured voltage 112 of the DC link 50 between the generator-side converter 46 and the grid-side converter 48 provided as feedback from the generator-side converter 60. In other embodiments, only some of the above inputs are communicated to the converter controller 96. The inputs that the converter controller 96 requires to perform its function are dependent upon the desired method of conversion.

The converter controller 96 generates a reference voltage signal 114 for each phase using the inputs 108, 110 communicated to it from the PLL 90 or the inputs 112 fed back to it from the converter 46. The phase-specific reference voltage signal 114 is comparable against a carrier signal as in FIGS. 5 and 6 to enable the gate signal 102 to be generated as discussed previously. It will be appreciated that the generation of a reference voltage signal 114 by the converter controller 96 is one function that the converter controller 96 performs as part of a wider control system within a wind turbine generator.

The generation of a reference voltage signal 114 would be known to the skilled reader and so will not be discussed in further detail.

The output reference voltage signal 114 from the converter controller 96 is communicated to an arm balancing module 98, along with further inputs including the measured connector current 116, the measured voltage 118 of the DC link 50 and a relevant voltage 118 for the particular cell 76. Again, it will be appreciated that in other embodiments, the inputs to the arm balancing module 98 vary according to the method of conversion desired.

The arm balancing module 98 implements a balancing algorithm to balance current distribution across each arm 70, 72 of the MMC 60. Implementing an arm balancing algorithm reduces current circulation and eddies, thereby reducing harmonics within the circuitry of the converter 46. Arm balancing algorithms, are generally known in the art of power conversion technologies.

For the one-phase system shown in FIG. 7, two arm modulation index references 120, one for each of the two arms 70, 72 of the phase being considered, are output from the arm balancing module 98 and communicated to the pulse-width modulator 100. The arm modulation index references 120 correspond to the reference signal 114 and are modulated versions of the reference signal 114 calculated to ensure that the current on each arm 70, 72 of the MMC 60 is balanced.

The pulse-width modulator 100 receives the arm modulation index references 120 and, in combination with other input variables, determines a modulated arm reference value 121 for each arm 70, 72. The modulated arm reference 121 for an arm 70, 72, as shown in chart c of FIG. 6, is an indication of the number of cells required to be turned to the active state, or 'inserted', as well as the required switching pattern. The modulated arm reference 121 is calculated by the comparison of the carrier signal and reference signal as demonstrated in chart a of FIG. 6 and in FIG. 5, followed by the compilation of the resulting signals as shown in chart b of FIG. 6. The input variables to the pulse-width modulator may comprise an arm current and voltage, and a cell voltage 122 measured at the MMC 60, and a switching frequency reference 124.

Receiving the switching frequency reference 124 as an input enables the pulse-width modulator to generate carrier signals, as will now be described.

The switching frequency reference 124 is calculated as follows. Initially, the electrical frequency 106 of the generator 38 is measured by the electrical frequency estimator 92. The electrical frequency estimator 92 may be connected directly to a rotating shaft of the generator 38 as represented in FIG. 7 or may connect to the connector 42 between generator 38 and generator-side converter 46. An electrical frequency estimator 92 measuring the electrical frequency 106 directly from the shaft of the generator 38 may be provided as an encoder, or as a speed sensor. Alternatively, the electrical frequency 106 may be determined by the PLL 90 or any other known sensorless speed estimation apparatus or method. Thus, the term speed sensor should be interpreted as encompassing any means for determining the electrical frequency of the generator, be it as a physical sensor or an algorithm that derives an estimate of electrical frequency based on other electrical parameters and signals.

In both cases, the measured electrical frequency 107 of the generator 38 is communicated to the gain module 94, whereby a switching frequency reference 124 is calculated. The switching frequency reference 124 is calculated to be proportional to the electrical frequency 106 of the generator 38, and so proportional to the speed of the generator. For example, when the generator 38 is operating in partial load below a nominal speed, the switching of the IGBTs is reduced to reduce switching losses. As the generator electrical frequency 106 is slower, there is an optimal and proportional switching frequency 124 that can achieve a substantially similar efficiency of conversion without the switching losses that would ordinarily be present. It should be noted that if the switching frequency were fixed and the generator speed was above the optimal speed for that particular switching frequency, then this may lead to a reduced power output as the system may not rectify the signal as accurately as would be possible if the switching frequency and generator speed were proportional as in the present invention. It is envisaged that proportionality as discussed herein is taken to mean a linear proportionality. However, non-linearly proportional relationships between the various parameters are also possible within the scope of this application.

To calculate the switching frequency 124, the following equation is used:

$$FSwRef = FSwNom * (Speed/SyncSpeed)$$

where FSwRef is the switching frequency reference, FSwNom is a nominal switching frequency, Speed is the instantaneous estimated speed of the generator as estimated using the electrical frequency estimator and SyncSpeed is the synchronous speed of the generator. The calculation of the synchronous speed would be known to the skilled reader. Particular minimum and maximum limits may be applied to FSwRef.

FSwNom is a nominal frequency having a constant value that corresponds to a minimum limit for the switching frequency in order to maintain system stability. A maximum limit for the switching frequency may also be set so that hardware is not forced to operate outside of its operational capacity. In some embodiments, the limits for FSwRef may be fixed, while in others they may be dynamic and may vary with operational conditions or other parameters. For example, the operational conditions may consist of ambient temperature, component temperature, wind speed, operational time or computational load of the control system 54.

So, for example, for a generator having a synchronous speed of 750 rpm, and a nominal frequency FSwNom of 550 Hz, the switching frequency reference at any generator speed below 750 rpm would be the minimum limit of 550 Hz, while a generator speed of 1500 rpm would correspond to a switching frequency reference of 1100 Hz.

Still considering FIG. 7, the switching frequency reference 124 is received by the pulse-width modulator 100, and used to modulate the carrier signal. As discussed above, the carrier signal is a sawtooth, inverse sawtooth or triangle wave and is compared with the arm modulation index reference 120, in the form a reference sine-wave signal, to determine the modulated arm reference 121. The pulse-width modulator 100 uses the switching frequency reference 124 to modulate the frequency of the carrier signal to be equal to that of the switching frequency reference 124, thereby increasing the number of pulses per cycle of the index reference 120 and hence increasing the switching frequency of the modulated arm reference 121 and so, the gate signals 102.

Following this, the respective modulated arm references 121 are communicated to the cell balancing module 121. The cell balancing module 121 receives the modulated arm references 121 from the pulse-width modulator 100 and additional inputs such as the voltages of each of the cell capacitors C and the currents 125 measured for each arm 70, 72.

The cell balancing module 121 implements a cell balancing algorithm to determine the cells 76 that are required to be switched to replicate the modulated arm reference at the arm 70, 72. The cell balancing algorithm, such as the sort and select algorithm as previously discussed, results in a plurality of gate signals for the arm 70, 72, an example of which has already been seen in chart d of FIG. 6.

Each respective gate signal 102 is then communicated from the cell balancing module 101 of the control system 54 to the corresponding cell 76 of the MMC 60 and implemented at the cell 76.

The control system 54 may, in some embodiments, be used to control both the machine-side converter 46 and the line-side converter 48, or just the line-side converter 48. In some embodiments, modules of the control system 54 may be combined to form one or more composite converter control modules configured to perform the same functions as the modules of the control system 54 that they encompass.

Figure 8:
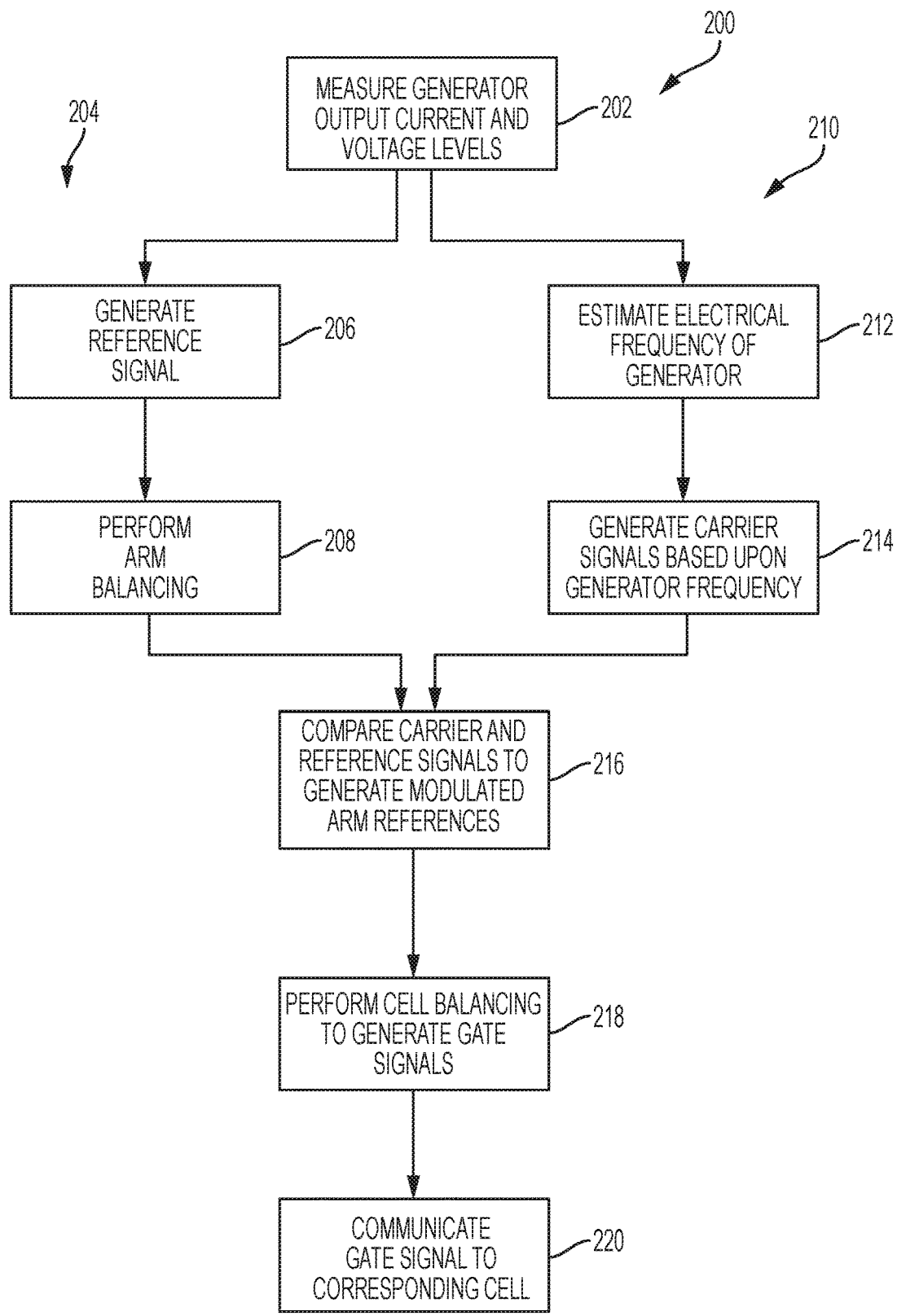
FIG. 8 is a flow chart outlining the operation of the control system of FIG. 7.

FIG. 8 illustrates a flow chart illustrating the method 200 of controlling the converter 46 using the control system 54. Referring to both FIGS. 6 and 7, initially the output current and voltage levels of the generator 38 are measured 202.

At the next step, the method 200 splits. In one stream 204 of the method 200, reference signals 152 are generated 206 and arm balancing is performed 208. In the other stream 210, the generator speed is estimated 212 before carrier signals 154 are generated 214.

The generated carrier signal 154 and reference signal 152 are then compared and a modulated arm references 121 generated 216. The modulated arm references 121 are used by the cell balancing module 101 to perform the cell balancing and generate 218 the gate signals 102. The gate signals 102 are finally communicated 220 to respective cells 76.

Many modifications may be made to the above examples without departing from the scope of the present invention as defined in the accompanying claims.

REFERENCES

[1] W. Li, L.-A. Gregoire, and J. Belanger, "Control and Performance of a Modular Multilevel Converter System" in Proceedings of C/GRE, Canada, Conference on Power Systems, Halifax, September 2011.
[2] M. Rejas, L. Mathe, P. D. Burlacu, H. Pereira, A. Sangwongwanich, M. Bongiorno, and R. Teodorescu, "Performance Comparison of Phase Shifted PWM and Sorting Method for Modular Multilevel Converters", 17*th European Conference on Power Electronics and Applications* (EPE'15 ECCE-Europe), Geneva, September 2015.
[3] S. Madichetty and A. Dasgita, "Modular Multilevel Converters Part-I: A Review on Topologies, Modulation, Modelling and Control Schemes" *International Journal of Power Electronics and Drive System*, Vol. 4, No. 1, March 2014.
[4] M. R. Islam, Y. Guo, and J. Zhu, "Power converters for wind turbines: Current and future development" in *Materials and Processes for Energy: Communicating Current Research and Technological Developments, Chapter* 15, 2013.
[5] K. Morozovska, "Interfacing Multi-Megawatt Large Scale Offshore Wind Turbine with Modular Multilevel Converter", Master Thesis at Delft University of Technology, 2015.

The invention claimed is:

1. A power conversion system for a wind turbine generator, comprising:
a machine-side converter having an AC voltage input from a generator and a DC voltage output to a DC link, wherein the machine-side converter is a modular multi-level converter comprising one or more converter legs corresponding to a respective one or more electrical phases of the generator, each of the converter legs comprising a plurality of converter cells;
a converter control module which provides the machine-side converter with a gate signal; and
an electrical frequency estimation module configured to estimate the mean electrical frequency of the generator, wherein the gate signal has at least one mean switching frequency corresponding to at least one electrical phase of the generator, and
wherein the converter control module is configured to modulate the mean switching frequency of the gate signal in dependence on the mean electrical frequency of the generator.

2. The power conversion system of claim 1, wherein the converter control module determines the mean switching frequency as proportional to the mean electrical frequency of the generator.

3. The power conversion system of claim 1, wherein the gate signal is generated by comparison of a carrier signal with a reference signal, wherein the carrier signal has a mean carrier frequency, and wherein the converter control module is configured to modulate the mean switching frequency of the gate signal by modulating the mean carrier frequency of the carrier signal.

4. The power conversion system of claim 1, wherein the converter control module is configured to determine if the mean electrical frequency of the generator exceeds a predetermined threshold, and, in response, to set the mean switching frequency to a predetermined limit level so as to maintain the stability of the system.

5. The power conversion system of claim 4, wherein the predetermined threshold is a variable threshold calculated according to measured operational parameters of the wind turbine generator.

6. The power conversion system of claim 4, wherein the predetermined threshold is a minimum speed threshold.

7. The power conversion system of claim 4, wherein the predetermined threshold is a maximum speed threshold.

8. The power conversion system of claim 1, wherein the electrical frequency estimation module comprises a phase-locked loop or a speed sensor.

9. The power conversion system of claim 1, comprising a line-side converter having a DC voltage input from the machine-side converter and an AC voltage output to a transformer, wherein the line-side converter is a modular multi-level converter comprising one or more converter legs corresponding to a respective one or more electrical phases of the generator, each of the converter legs comprising a plurality of converter cells, and wherein the power conversion system is configured to provide the line-side converter with a gate signal.

10. A method of controlling a power conversion system for a wind turbine generator, the power conversion system comprising a machine-side converter having an AC voltage input from a generator and a DC voltage output to a DC link, wherein the machine-side converter is a modular multi-level converter comprising one or more converter legs corresponding to a respective one or more electrical phases of the generator, each of the converter legs comprising a plurality of converter cells, the method comprising:
estimating a mean electrical frequency of the generator;
generating a gate signal having at least one mean switching frequency and corresponding to at least one phase of the generator;
modulating the mean switching frequency of the gate signal in dependence on the mean electrical frequency of the generator; and
communicating the gate signal to the modular multi-level converter.

11. A system, comprising:
a wind turbine, comprising:
   a tower; and
   a generator disposed on the tower; and
a power conversion system, comprising:
   a machine-side converter having an AC voltage input from the generator and a DC voltage output to a DC link, wherein the machine-side converter is a modular multi-level converter comprising one or more converter legs corresponding to a respective one or more electrical phases of the generator, each of the converter legs comprising a plurality of converter cells;
   a converter control module which provides the machine-side converter with a gate signal; and
   an electrical frequency estimation module configured to estimate the mean electrical frequency of the generator,
   wherein the gate signal has at least one mean switching frequency corresponding to at least one electrical phase of the generator, and
   wherein the converter control module is configured to modulate the mean switching frequency of the gate signal in dependence on the mean electrical frequency of the generator.

12. The system of claim 11, wherein the converter control module determines the mean switching frequency as proportional to the mean electrical frequency of the generator.

13. The system of claim 11, wherein the gate signal is generated by comparison of a carrier signal with a reference signal, wherein the carrier signal has a mean carrier frequency, and wherein the converter control module is configured to modulate the mean switching frequency of the gate signal by modulating the mean carrier frequency of the carrier signal.

14. The system of claim 11, wherein the converter control module is configured to determine if the mean electrical frequency of the generator exceeds a predetermined threshold, and, in response, to set the mean switching frequency to a predetermined limit level so as to maintain the stability of the system.

15. The system of claim 14, wherein the predetermined threshold is a variable threshold calculated according to measured operational parameters of the wind turbine generator.

16. The system of claim 14, wherein the predetermined threshold is a minimum speed threshold.

17. The system of claim 14, wherein the predetermined threshold is a maximum speed threshold.

* * * * *